Figure 2:
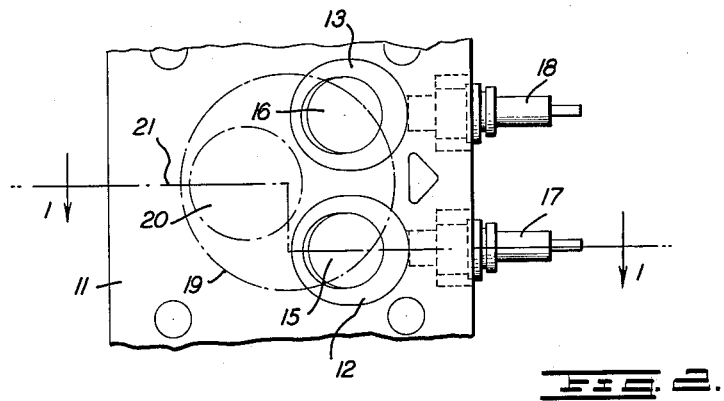

April 18, 1961 A. H. MÜLLER 2,980,094
COMBUSTION CHAMBER FOR PISTON-TYPE INTERNAL
COMBUSTION ENGINES
Filed May 11, 1959

INVENTOR
ALFRED H. MÜLLER

BY Dickey, Craig & Freudenberg
ATTORNEYS

United States Patent Office 2,980,094
Patented Apr. 18, 1961

2,980,094

COMBUSTION CHAMBER FOR PISTON-TYPE INTERNAL COMBUSTION ENGINES

Alfred H. Müller, Waiblingen, Germany, assignor to Daimler-Benz Aktiengesellschaft, Stuttgart-Unterturkheim, Germany Filed May 11, 1959, Ser. No. 812,402

Claims priority, application Germany May 14, 1958

9 Claims. (Cl. 123—191)

The present invention relates to the construction of a combustion chamber in the cylinder of an internal combustion engine provided with external auto-ignition which chamber is subdivided into a plurality, preferably into two individual combustion chambers or sectional combustion chambers, each provided with an ignition device, which are closed off from each other when the piston is in the upper dead center position whereby a squish chamber is formed between the underside of the cylinder head and a portion of the piston top or bottom with the latter in the top dead center position.

In order to obtain a high thermal efficiency with a piston-type internal combustion engine provided with external auto-ignition, the following essential requirements must be fulfilled:

Short distances for the flame travel so as to obtain a relatively rapid combustion in order that the engine, also at partial loads, may be operated with high compression ratios and relatively lean mixtures. This requirement is especially of great importance in the operation of high-speed engines.

Furthermore, a high degree of vorticity is of importance at the end of the compression stroke for the better preparation of the mixture prior to combustion thereof in order to satisfy one of the prerequisites for a uniform combustion process.

Additionally, the disposition of the spark plug in the combustion chamber must be such that, aside from the short flame travels, the combustion of the main mass of the combustion mixture must take place in the vicinity of the hot exhaust valve or valves.

Furthermore, a small ratio of surface to the volume of the combustion space or chamber is necessary in order to keep the direct heat losses from the combustion chamber to a minimum. Finally, the temperature during the combustion process of the fresh fuel mixture which participates last in the combustion process has to be kept relatively low in order to avoid sudden and spontaneous combustion and the occurrence of detonation or knocking, that is, the part of the combustion chamber which is most remote from the spark plug has to have a large ratio of surface to volume thereof.

The aforementioned requirements are satisfied only partially with the known types of the prior art combustion chambers. In order to improve the combustion process for such known combustion chambers, two spark plugs have been arranged, at times, in one and the same combustion chamber disposed opposite from each other. However, such arrangements have the disadvantage that the fresh or uncombusted fuel mixture trapped between the two flame fronts or between the two pressure fronts emanating from the points of ignition, are compressed to such an extent that it burns rapidly with a sudden burst or detonation. Consequently, arrangements with two spark plugs in one and the same combustion chamber have not been satisfactory for increasing the antiknocking or anti-detonation property of an engine notwithstanding the relatively short flame paths which are made possible thereby.

It is also known in the prior art of internal combustion engines to subdivide the combustion chamber of one cylinder into two individual or sectional combustion chambers each provided with a spark plug and which are closed off from each other when the piston is in its upper dead center position thereof whereby a squish chamber is formed between the underside of the cylinder head and a portion of the piston top. According to such prior art arrangements, the inlet duct or channel, normally controlled by the inlet valve, is led into or terminates in one of the two sectional combustion chambers, whereas the exhaust duct or channel, controlled by the exhaust valve, is led away from the other sectional combustion chamber. Such an arrangement, however, results in an uneven combustion process in the two sectional combustion chambers because; the combustion process is not the same in the two sectional combustion chambers, under otherwise identical conditions with respect to the shape and design of the combustion chamber, the size of the combustion chamber, the disposition of the spark plugs and the position of the respective valve if one includes the relatively cool inlet valve and the other the relatively hot exhaust valve. Even though the location of the hot exhaust valve, especially with respect to the arrangement of the spark plug, plays an important role in the combustion process, the mere presence of the exhaust valve itself is unquestionably of particularly basic significance. Undoubtedly, the combustion process takes place more slowly in the sectional combustion chamber in which the cooler intake valve is located than in the sectional combustion chamber in which the hotter exhaust valve is disposed, whereby all the advantages would be lost again which are to be obtained by the present inventive arrangement such as, among other features, the combustion of the main portion of the fresh fuel mixture in the vicinity of the hot exhaust valve.

In order to eliminate the disadvantages which are normally encountered in these known combustion chamber designs, the present invention provides a separate, controlled exhaust means for each sectional combustion chamber and to terminate the intake or inlet in the region of the underside of the cylinder head in such a manner that the inlet valve together with a portion of the piston top or piston bottom forms a part of the entire squish chamber.

According to a further feature of the present combustion chamber, the inlet member which may consists, for instance, of a disk-type or poppet valve as viewed in the projection thereof, lies essentially within one half of the circular area defined by the cylinder walls while the two sectional combustion chambers and the exhaust valves associated therewith are arranged within the cylinder head essentially within the other half of the cylinder area.

The aforementioned prerequisite for an unobjectionable combustion process of the internal combustion engine which is satisfactory under all operating conditions are satisfied to a very large extent.

Furthermore, the requirement to keep relatively low the temperature of the fresh fuel mixture which participates in the combustion process during the last phase thereof is realized to a high degree by the present invention because the wall portions of both sectional combustion chambers, arranged opposite the respective spark plugs, are disposed on the side of the cooler intake channel or inlet duct, which aids in the prevention of the occurrence of detonation and knocking. Aside from this, the sectional combustion chambers, according to the present invention, operate under identical conditions whereby optimum operating conditions are created.

Accordingly, it is an object of the present invention to provide a combustion chamber arrangement for an internal combustion engine in which the flame fronts originating at the point of ignition travel over the shortest possible distance.

A further object of the present invention resides in the provision of a combustion chamber arrangement for an internal combustion engine which makes readily possible operation of the engine with a high compression ratio and a lean mixture at partial loads.

A still further object of the present invention resides in the provision of a combustion chamber arrangement for an internal combustion engine which enables the engine to be operated at extremely high speeds.

Another object of the present invention lies therein that a vortex is produced in the combustion chamber of an internal combustion engine at the end of the compression stroke which effectively aids in the preparation and formation of the combustible mixture so as to insure uniform combustion thereof.

Another object of the present invention resides in the provision of a sectional combustion chamber arrangement for an internal combustion engine in which the largest portion of the combustible mixture in concentrated essentially in the vicinity of the exhaust valve.

It is still another object of the present invention to provide a combustion chamber for an internal combustion engine in which the ratio of the chamber wall surface to the chamber volume is extremely low whereby the heat losses from the chamber are kept to a very minimum.

A further object of the present invention resides in the provision of a subdivided combustion chamber arrangement of an internal combustion engine in which the combustible mixture that participates in the last phase of the combustion process is kept at a relatively low temperature to thereby avoid detonation and engine knocking.

It is another object of the present invention to provide a combustion chamber for an internal combustion engine in which the combustible mixture located within the chamber at a point most remote from the point of ignition thereof has a relatively large ratio of surface area to volume thereof.

Still another object of the present invention resides in the provision of a combustion chamber for an internal combustion engine which increases the antiknocking property of the engine.

It is still a further object of the present invention to provide a combustion chamber arrangement for an internal combustion engine with which a high thermal efficiency in engine operation is obtainable.

Figure 1:
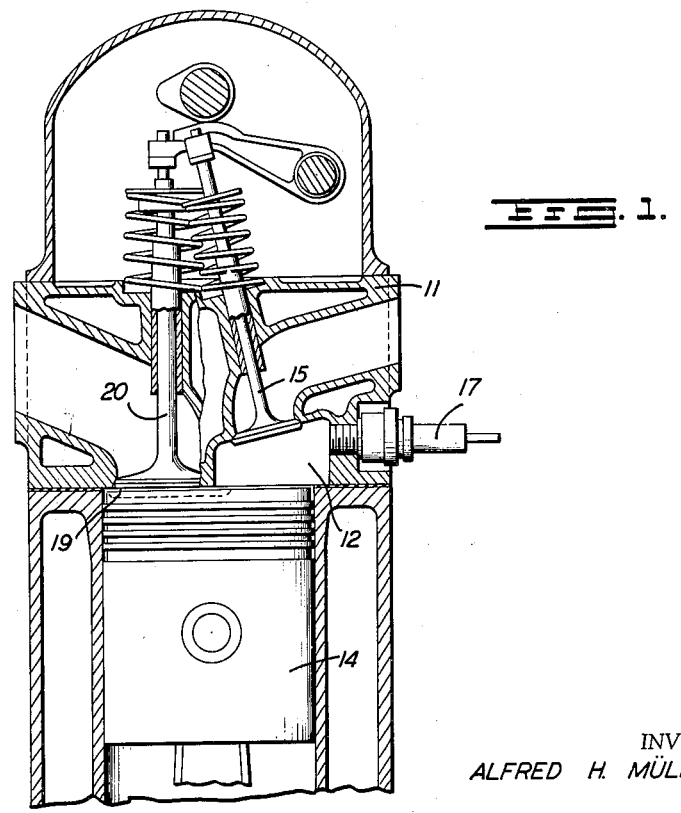

These and other objects, features and advantages of the present invention will become more obvious from the following description when taken in connection with the accompanying drawing which shows, for purposes of illustration only, one embodiment in accordance with the present invention and wherein:

Figure 1 is an elevational cross-sectional view through the cylinder and cylinder head of an internal combustion engine according to the present invention, and Figure 2 is a plan view of the underside of the cylinder head shown in Figure 1.

Referring now to the drawing, wherein like reference numerals are used throughout the two views thereof to designate like parts, the entire combustion chamber of the internal combustion engine according to the present invention is disposed within the cylinder head 11 and is subdivided into two sectional combustion chambers 12 and 13 which are practically completely separated from each other by the piston 14 when in the upper dead center position thereof as shown in Figure 1. One exhaust valve 15 and 16 as well as one spark plug 17 and 18 each is provided in each of the sectional combustion chambers 12 and 13, respectively.

A squish chamber 19 is formed between a portion of the piston top, on the one hand, when the piston is in the upper dead center position thereof, and a portion of the underside of the cylinder head 11, on the other, whereby favorable vorticity of the fuel mixture is obtained. Either a combustible mixture, as is the case with a carburetor engine, or air, as is the case with a direct fuel injection engine, is drawn into the cylinder through the intake valve 20 which has a relatively large diameter. The center of the intake valve 20 lies on a transversely extending principal axis 21 of the engine cylinder. The relatively large cross section of the intake valve 20 together with the favorable inlet or inflow conditions into the cylinder while preventing at the same time any heating of the fresh mixture as, for instance, would take place by an adjacent exhaust valve, results in a high volumetric efficiency and thereby in a high specific output of the engine. The two sectional combustion chambers 12 and 13 are symmetrically arranged with respect to the main axis 21 of the cylinder and are brought close to the intake valve 20 so that as large as possible a transfer or overflow passage is created between the two sectional combustion chambers 12 and 13 and the cylinder. The spark plugs 17 and 18 which are preferably arranged horizontally opposite the squish chamber 19 and as close as possible to the exhaust valves 15 and 16 respectively, are effectively cooled at the end of the compression stroke by the turbulence of the fresh mixture flowing thereagainst from the squish chamber 19. The axes of the exhaust valves 15 and 16 are inclined and cross the axis of the intake valve thereabove whereby the actuation of the valves is simplified.

Due to the face that the exhaust valves 15 and 16 are of a relatively small diameter, the paths through which heat is carried off to the valve seats thereof are relatively short which results in low valve temperatures and which, in turn, increases the antiknocking property of the engine.

While I have shown and described one embodiment in accordance with the present invention, it is understood that the same is not limited thereto but is susceptible of many changes and modifications within the spirit and scope of the present invention and I, therefore, do not wish to be limited to the details shown and described herein but intend to cover all such changes and modifications as encompassed by the scope of the appended claims.

I claim:

1. A combustion chamber arrangement for an internal combustion engine comprising cylinder means forming a cylinder space, a piston slidably mounted in said cylinder space, a cylinder head including a lower cylinder head wall portion effectively closing off at least a portion of the cylinder space formed by said cylinder means, combustion chamber means formed in said cylinder head subdivided into at least two sectional combustion chambers, separate exhaust means for each of said sectional combustion chambers, and inlet means in said cylinder head terminating within the region of said cylinder head wall portion.

2. A combustion chamber arrangement according to claim 1, further comprising separate ignition means for each of said sectional combustion chambers, the top of said piston in the upper dead center position thereof effectively closing off one sectional combustion chamber from the other and simultaneously forming with said cylinder head wall portion a squish chamber to thereby produce a vortex in said combustion chambers.

3. A combustion chamber arrangement according to claim 1, wherein said internal combustion engine is a carburetor-type engine including external auto-ignition means.

4. A combustion chamber arrangement for an internal combustion engine comprising cylinder means, a piston slidably mounted in said cylinder means, a cylinder head including a lower cylinder-head wall portion closing off a portion of the cylinder space formed by said cylinder means, combustion chamber means located in said cylinder head and subdivided into at least two sectional combustion chambers, one part of the top of said piston in the upper dead center position thereof effectively substantially closing off said sectional combustion chambers from each other and another part of said piston together with said cylinder-head wall portion simultaneously forming a squish chamber therebetween for producing a vortex in said combustion chambers, exhaust means for each of said sectional combustion chambers, and inlet means provided in said cylinder head terminating in the region of said cylinder-head wall portion, wherein inlet valve means includes a valve-disk, wherein the circumferential boundary of said inlet valve-disk lies essentially within one half of the circular area formed by said cylinder means, said exhaust means including exhaust valves, and wherein said sectional combustion chambers and said exhaust valves are arranged to a large extent within the other half of the circular area formed by said cylinder means.

5. A combustion chamber arrangement according to claim 4, wherein the axis of said inlet valve-disk is disposed essentially on a diameter of said cylinder means, and said exhaust valves are located in symmetrical relationship with respect to said diameter on opposite sides thereof.

6. A combustion chamber arrangement according to claim 5, wherein said exhaust valves are so arranged in said cylinder head in relation to said inlet valve-disk that the longitudinal axes of said exhaust valves cross the longitudinal axis of said inlet valve-disk above the respective valve-actuating points.

7. A combustion chamber arrangement according to claim 4, wherein said exhaust valves include valve seats having such an inclination that the longitudinal axes of said inlet valve-disk and said exhaust valves mutually cross above the respective points of valve actuation.

8. A combustion chamber arrangement according to claim 1, wherein the top of said piston in the upper dead center position thereof effectively closes off one sectional combustion chamber from the other and simultaneously forms with said cylinder-head wall portion a squish chamber to thereby produce a vortex in said combustion chambers.

9. A combustion chamber arrangement for internal combustion engines with external auto-ignition comprising a piston and a cylinder head, combustion chamber means formed in said cylinder head subdivided into at least two sectional combustion chambers each provided with ignition means, a squish chamber formed between the underside of said cylinder head and a portion of the top of said piston being in communication with said combustion chambers, the height of said squish chamber being equivalent to the minimum allowable clearance between the underside of said cylinder head and the top of said piston in the upper dead center thereof, a motion controlled exhaust valve provided in each of said combustion chambers at the top walls thereof and a motion controlled inlet valve terminating in the underside of said cylinder head and in the region thereof adjacent to said squish chamber.

References Cited in the file of this patent

UNITED STATES PATENTS

| | | |
|---|---|---|
| 1,892,129 | Barkeij | Dec. 27, 1932 |
| 2,041,073 | LaBrie | May 19, 1936 |
| 2,324,705 | Huber | July 20, 1943 |
| 2,652,039 | Weslake | Sept. 15, 1953 |
| 2,763,254 | Klug | Sept. 18, 1956 |
| 2,800,123 | Fisher | July 23, 1957 |